United States Patent [19]

Korsak

[11] 4,432,142

[45] Feb. 21, 1984

[54] KEY CODE

[75] Inventor: Andrew J. Korsak, Redwood City, Calif.

[73] Assignee: All-Lock Electronics, Inc., North Brunswick, N.J.

[21] Appl. No.: 352,547

[22] Filed: Feb. 26, 1982

[51] Int. Cl.[3] .......... G01B 7/00; E05B 35/04

[52] U.S. Cl. .......... 33/174 F; 70/352; 70/387; 70/405

[58] Field of Search .......... 33/174 L, 174 F; 70/350, 352, 387, 358, 405, 406, 460

[56] References Cited

U.S. PATENT DOCUMENTS

| | | | |
|---|---|---|---|
| 3,393,542 | 7/1968 | Crepinsek | 70/406 |
| 3,640,107 | 2/1972 | Litvin | 70/405 |
| 3,824,818 | 7/1974 | Neale | 70/358 |
| 3,877,267 | 4/1975 | Harris, Jr. | 70/358 |
| 4,007,615 | 2/1977 | Nossum | 70/387 |
| 4,283,859 | 8/1981 | Roland | 33/174 F |

FOREIGN PATENT DOCUMENTS

| | | | |
|---|---|---|---|
| 482107 | 4/1952 | Canada | 70/387 |
| 483070 | 1/1970 | Switzerland | 70/460 |
| 2081368 | 2/1982 | United Kingdom | 70/352 |

*Primary Examiner*—Richard R. Stearns

*Attorney, Agent, or Firm*—Larson and Taylor

[57] ABSTRACT

A key reading system including a key having a plurality of rows of reading positions, each reading position co-operating with a reading position in each other row to form a set of reading positions. The reading system includes a clock line which senses all but one of the total number of code combinations of each set as a clock pulse, thus eliminating the need for a separate clock pulse row.

3 Claims, 2 Drawing Figures

KEY CODE

TECHNICAL FIELD

This invention relates to the key-lock art, and in particular it relates to a new and improved system for reading a key and electronically transmitting this reading to perform a function.

BACKGROUND OF THE INVENTION

Arrangements are known for reading physical characteristics such as indentations or raised projections on one or more generally flat sides of a key, utilizing reading pins, and transmitting this reading, via electric or electronic means, to carry out a function. Such functions may include for example identifying the key holder, permitting access to a door or other secure area, or conveying the information to a key making machine to manufacture a duplicate of that key. Such an arrangement is shown in commonly owned U.S. Pat. No. 4,283,859, the subject matter of which is incorporated by reference herein.

While this prior arrangement has proved highly successful, it has been found that in certain applications of the invention, spacial requirements are so restricted that there is insufficient room for the prior arrangement. In such cases, a need exists for improvements which will allow further miniaturization of the key reading system.

SUMMARY OF THE INVENTION

It is a purpose of the present invention to provide a new and improved key reading system of the type in the above mentioned patent which has pins capable of reading physical characteristics such as raised projections on or indentations in a key, and transmitting that information electrically or electronically, wherein the spacial requirements are sufficiently reduced to allow application of such a system in a more restricted space than is possible with the prior arrangement.

In accordance with the present invention, this purpose is achieved by arranging the code on the key, i.e. the physical characteristics, to permit a higher number of combinations in a smaller space. Although the said prior patent discloses an arrangement wherein the individual indentations may have a plurality of different depths, including a binary arrangement wherein only two different levels are present, in practice, it has been found that speed and reliability are enhanced by using the binary arrangement, i.e. only two different levels such as the presence or absence of an indentation. In the restricted space on a key, it may be practical to provide no more than two rows of reading positions. Since one of these rows must be used to give the clock pulse to sense the presence of a new reading position, this leaves only one row for code pulses. However, if there is provided only a single row of code reading positions along the key, the total number of combinations is only two to the power of the number of reading positions along the key. For example, a row of 16 reading positions along the key with two possibilities at each position would give a total number of combinations of two to the sixteenth power, or 65,536 positions. However, if it were necessary to shorten the key to allow only ten reading positions with two possibilities at each position, the number of combinations would be severely reduced to two to the tenth power, or 1,024 combinations.

In accordance with the present invention, the number of combinations is substantially increased for a given number of reading positions along the length of the key. Instead of restricting one row for use as a clock pulse row, all rows are used as code pulse rows, and the presence of any code having any projection or indentation will be sensed as indicating that a new reading position is located at the pins and is to be read. Assuming that the key is provided with only two rows of reading positions along the key, a reading pin would be provided for each row. While, as stated above, the key can have at any given reading position either raised projections or recessed indentations, for practical reasons any given key will have one or the other, but not both. The following discussion will for convenience relate only to the embodiment having at each reading position either a flat surface or recessed indentations. In accordance with the present invention as applied to two rows of reading positions, and a pin for each row, at each reading position three possibilities exist, either an indentation in the first row, an indentation in the second row, or an indentation in both rows. The fourth combination of no indentations in either row is not utilized because at least one indentation is necessary to convey the information to the clock line means that a reading position is present at the pins.

Hence, with ten reading positions along the length of the key, and three possibilities at each position, the total number of combinations for ten positions is three to the tenth power, or 59,049, which of course is a significant improvement over a total of 1,024 combinations on a key of the exact same size and with the exact same number of rows of reading positions.

Hence, it is an object of the present invention to provide a new and improved coded key.

It is another object of the present invention to provide a new and improved key reading system requiring considerably less space than prior arrangements.

It is still another object of this invention to provide a new and improved coding arrangement on a key wherein all rows serve as code rows, and the presence of any code in those rows is utilized as a clock pulse signal.

These and other objects of the present invention will become apparent from the detailed description to follow, taken together with the accompanying drawings.

BRIEF DESCRIPTION OF THE DRAWINGS

There follows a detailed description of preferred embodiments of the present invention to be read together with the accompanying drawings wherein.

DETAILED DESCRIPTION OF THE PREFERRED EMBODIMENTS

Figure 1:
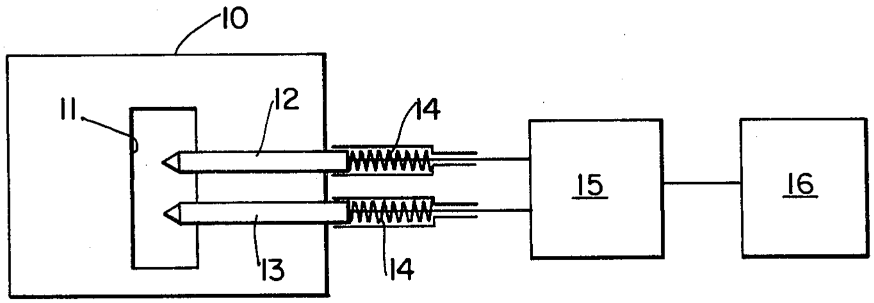
FIG. 1 is a schematic view of a key reading apparatus utilizing the present invention.

Referring now to the drawings, like elements are represented by like numerals throughout the several views.

Figure 2:
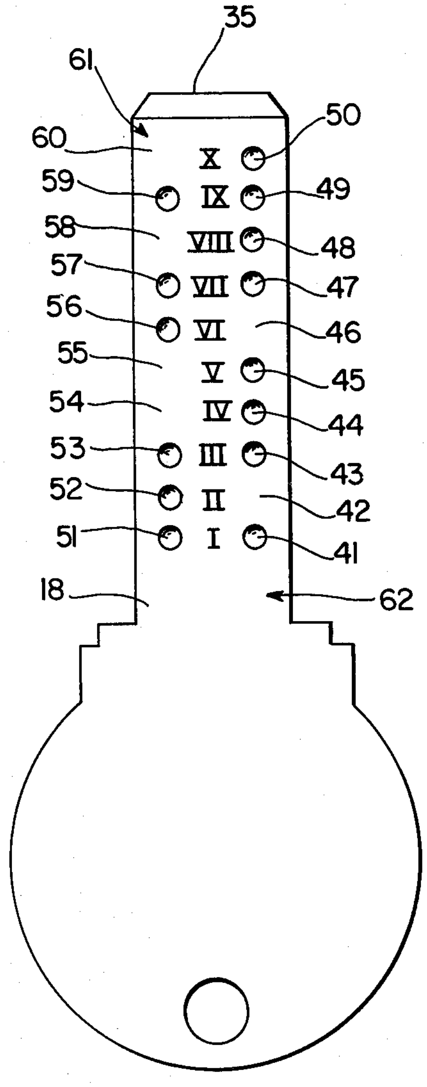
FIG. 2 is an enlarged side view of a key including the features of the present invention.

FIG. 1 illustrates schematically a key reader which may be constructed as shown in the said prior patent. The housing 10 has a key slot 11 for receiving key 18 (FIG. 2). A pair of reading pins 12 and 13 are urged outwardly by resilient means 14 into key slot 11. When key 18 is inserted into slot 11, all of its reading positions will pass by pins 12 and 13 and be read before the key reaches its fully inserted position. Control means 15 senses the code being read, wherein the presence of any code conveys to means 15 the fact that a reading position is in location at the pins and is being read.

Referring primarily to FIG. 2, the key 18 comprises two parallel rows of reading positions which are identified in FIG. 3 as 41–50 in the right row and 51–60 in the left row, respectively. Each reading position has a matched pair in the other row, the two together forming a cooperating pair, there being ten pairs as indicated by the Roman numerals I–X in FIG. 2. At each reading position, there may be provided two recesses such as recesses 41 and 51 at position I, or only a recess in the left row, such as at 52 in position II, or only a recess in the right row, such as at 44 or 45 in positions IV and V. Hence, at any of the ten positions, three conditions are possible.

Many modifications and variations of the key codes will be evident. In the preferred arrangement only recesses are used so that in any given position the key will include either a flat surface or a recess. Alternatively, raised projections can be used so that at any given position the key will have either a flat surface or a raised projection. For purposes of economics, recesses are far preferable to raised projections. Further, since each reading pin only requires two positions, there is no need to mix on a given key three different levels by mixing the flat surface, recesses and raised projections. However, if it were desired to provide three different positions for the reading key, this could be accomplished. Also, while the present invention illustrates only two rows of codes with a total of ten reading positions, it will be apparent that if desired, a third or more rows could be provided and more or less then ten reading positions could be provided. As merely one example, if in a given situation the length of the key had to be severely reduced but slightly more horizontal space was possible, and the apparatus and the key were constructed with four reading positions I–IV with four code positions at each reading position to cooperate with four different reading pins, then fifteen different conditions would be possible at each of the reading positions I–IV, (i.e. all combinations except the absence of any indentations or projections since this combination would not create a clock pulse signal) so that the total number of combinations for this key would be fifteen to the fourth power, or 50,625. If a fifth reading position V were added, this would increase the number of combinations to 759,375.

There is shown schematically in FIG. 1 a box 15 which represents means for sensing the positions of the pins at each reading position and transmitting a signal to the unit 16 which is representative of a virtually unlimited number of kinds of devices which can utilize this information, examples being means for identifying the person having possession of the key, permitting access to a door or other security area, manufacturing a key which will duplicate the inserted key, etc. Diagrammatic element 15 would also include a clock line means, the details of which are known per se and need not be described herein, which would sense and distinguish each time that a new key reading position was cooperating with the pins. Since each key reading position contains at least one depression, then the sensing of one or two depressions at the key reading position would provide the signal for the clock line means.

The operation of the invention will be apparent from the preceding discussion. However, briefly by way of summary, the present invention would operate as follows, using as an example the specific key 18 shown herein. As the key 18 is inserted, its bevelled tip 35 would engage both pin tips 12 and 13 and move them rearwardly until they rode up onto the flat leading edge area 61 just behind the bevelled front 35. Position X would then engage the two reading pins. During this reading the clock line means associated with element 15 would sense that the first position is being read. A change from the no key position to the leading edge position would have alerted sensor 15 to the fact that a reading position will now commence. As the key 18 is moved farther into the slot, position IX would engage the pins, both of which would move into the respective recesses 49 and 59. Again, the clock line means would sense that the key has now brought the next reading position to the pins. This sequence would continue until the last position, namely position I, has been read after which the pin tips 12 and 13 would ride up on rear flat area 62. In practice, these readings can be made so rapidly that the operator would simply insert the key rapidly without discerning the individual positions. Specifically, each reading can be made in no more than seventy milliseconds.

In the present example, assuming that a recess in the left row is read as "one", a dimple in the right row is read as "two" and a dimple in both rows is read as "three", then the code of key 18, reading from position I to X, would be 3, 1, 3, 2, 2, 1, 3, 2, 3 and 2, just one out of 59,049 combinations.

Although the invention has been described in considerable detail with respect to preferred embodiments thereof, it will be apparent that the invention is capable of numerous modifications and variations, apparent to those skilled in the art, without departing from the spirit and scope of the invention.

I claim:

1. A key reading system comprising:

a key having a plurality of rows, each row having a plurality of reading positions along its length, each reading position in one row cooperating with a reading position in each other row to form a cooperating set of reading positions, there being a plurality of such sets along the length of the key, each reading position being constructed with either a first physical characteristic or a second physical characteristic, except that no one of said sets has only second physical characteristics at every one of its reading positions, a key reading apparatus having reading means for reading the physical characteristics of the reading positions of each of said sets, taken in succession from the first set to the last set, said reading means including a clock line means for distinguishing the presence of each set at the reading means, said clock line means being responsive to distinguish the presence of a set, in response to a reading of any combination of first or second physical characteristics except all second physical characteristics.

2. The key reading system of claim 1, wherein the key is of the type having at least one flat side, with the physical characteristics formed thereon, and said first physical characteristic comprises indentations formed into the side of the key, and the second physical characteristic comprises a continuity of the flat surface of the key at that reading position.

3. The key reading system of claim 2, the reading means comprising reading pins spring biased into the indentations.

* * * * *